United States Patent [19]

Miller et al.

[11] 4,167,666

[45] Sep. 11, 1979

[54] MULTI-GRATING ATTENUATOR FOR HIGH POWER PULSED LASER BEAMS

[75] Inventors: Thomas G. Miller, Auburn; Billie O. Rogers; Thomas G. Roberts, both of Huntsville, all of Ala.

[73] Assignee: The United States of America as represented by the Secretary of the Army, Washington, D.C.

[21] Appl. No.: 900,943

[22] Filed: Apr. 28, 1978

[51] Int. Cl.² ............................................. H01J 39/12
[52] U.S. Cl. .................................... 250/216; 250/229; 250/237 R; 250/237 G
[58] Field of Search ............... 250/216, 229, 232, 233, 250/237 R, 237 G; 350/160 R

[56] References Cited

U.S. PATENT DOCUMENTS 4,035,088   7/1977   Jenkins et al. ....................... 356/218

Primary Examiner—David C. Nelms
Assistant Examiner—Darwin R. Hostetter
Attorney, Agent, or Firm—Nathan Edelberg; Robert P. Gibson; Harold W. Hilton

[57] ABSTRACT

A device that can be used with high repetitions, high power, pulsed laser beams for beam diagnostics is described. The device utilizes a plurality of hole gratings made from wires or beam attenuators which are positioned in the laser beam by a synchronization technique for firing the high power pulsed laser. Each grating is in the high power beam for one pulse and is then out of the beam for (n-1) pulses, when n is the number of gratings used, to allow for cooling before it is used again.

3 Claims, 3 Drawing Figures

MULTI-GRATING ATTENUATOR FOR HIGH POWER PULSED LASER BEAMS

DEDICATORY CLAUSE

The invention described herein may be manufactured, used, and licensed by or for the Government for governmental purposes without the payment to us of any royalties thereon.

BACKGROUND OF THE INVENTION

To characterize the beam from a high power laser, it is necessary to isolate atmospheric distortions of the beam while operating the laser at full output power. To keep the transmitted beam intensity below the threshold for atmospheric disturbances, a hole grating or beam attenuator is used. These techniques are now well developed for this type of measurement and can be found in most textbooks on optics such as Principles of Optics by Max Born and Emit Wolf.

For high power cw lasers such as the GDL (gas dynamic lasers), a low transmission ($\approx 4\%$) cooled hole grating is used to attenuate the beam. For high power pulsed lasers operating in the single pulsed mode, a high transmission hole grating made from wires has been found to be useful. In this case the intensity distribution is measured in one of the higher orders of the diffraction patterns.

It is an object of this invention to supply a device which allows for the measurement of the intensity distribution of each pulse in the pulse train from a high power laser.

It is an additional object of this invention to supply a technique for positioning each grating in the laser beam at the appropriate time.

DETAILED DESCRIPTION OF THE INVENTION

Figure 1:
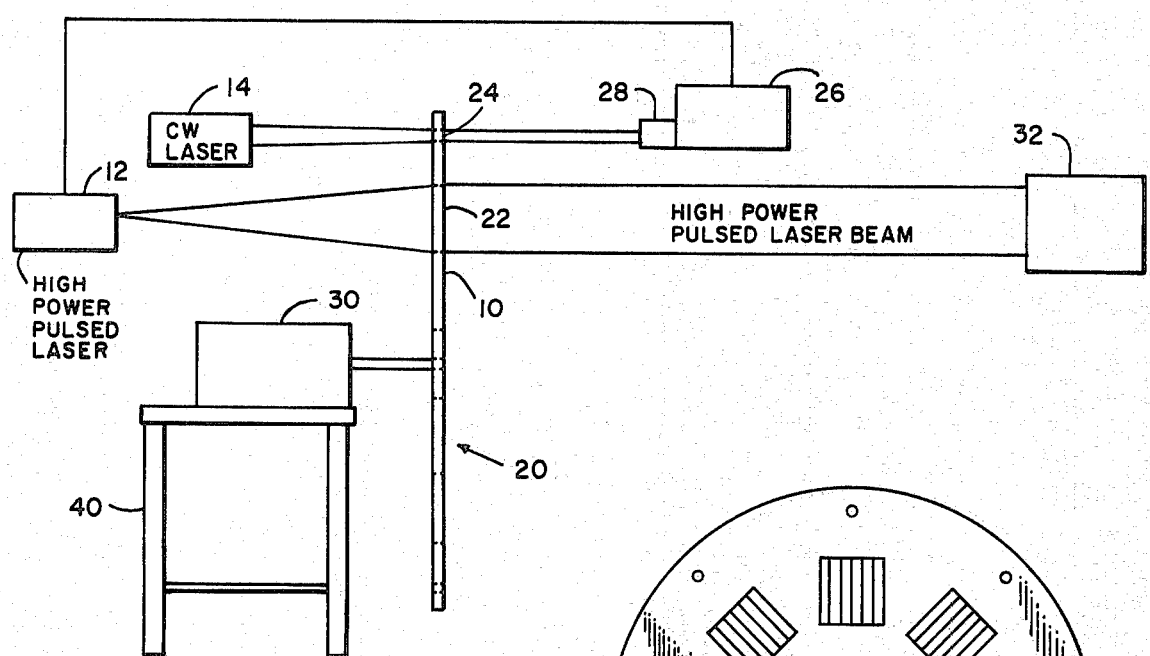
FIG. 1 is a schematic illustration of the multi-grating attenuator for use with high power pulsed lasers.
Figure 2:
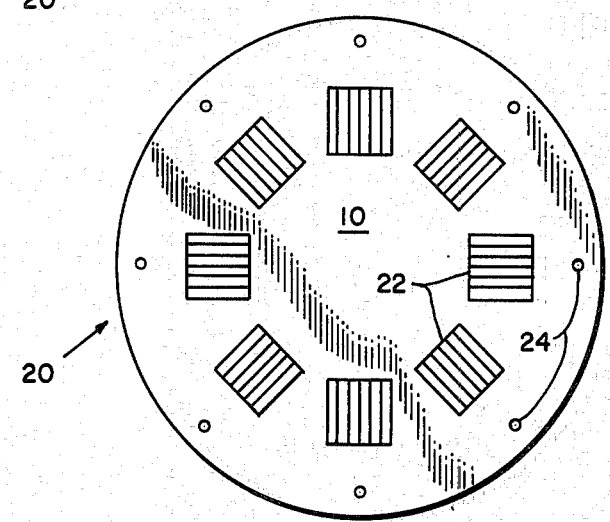
FIG. 2 is a view of the attenuator disk of FIG. 1.

Referring to the drawing, in FIG. 1 the multi-grating attenuator 10 includes a disk 20 on which the wire gratings 22 are mounted; the disk is rotated by a motor 30 which is mounted on a stand 40. The RPM of the motor is adjusted so that a different grating is aligned with the laser beam from a high power pulsed laser 12 for each pulse. Thus if n gratings are used then each grating sees only 1/n of the pulses. During the time that a grating is not being used, it is allowed to cool or recover to its original condition before it is used again. To insure that each grating is in the proper position when the beam from the high power pulsed laser arrives, a small cw laser 14 such as a He-Ne laser is used to trigger the high power pulsed laser. The beam from the cw laser is blocked by the disc except when a small hole 24 in the disk passes the cw laser beam. This allows a pulse of light from the cw laser to initiate an electrical pulse generator 26 through a photodiode 28. The output of this electrical pulse generator is then used to fire or trigger the high power pulsed laser so that the high power laser beam arrives at the grating when it is in the proper location and passes therethrough to the test apparatus 32. For the test made with the A high power pulsed laser, the system delay was so short that the holes 24 in the disk were placed above the center of each grating. That is, the motion of the disk is negligible during the time which elapsed between the cw laser beam leaving the disk and the high power pulse arriving at the grating. The gratings used are constructed from wires. With the use of these gratings, the intensity distribution in each order is the same and measurements of the beam quality may be made in a higher order where the power is low enough to allow for accurate work. Thus, one can know exactly what the beam looks like on the target 32 (neglecting thermal blooming and other nonlinear effects).

Figure 3:
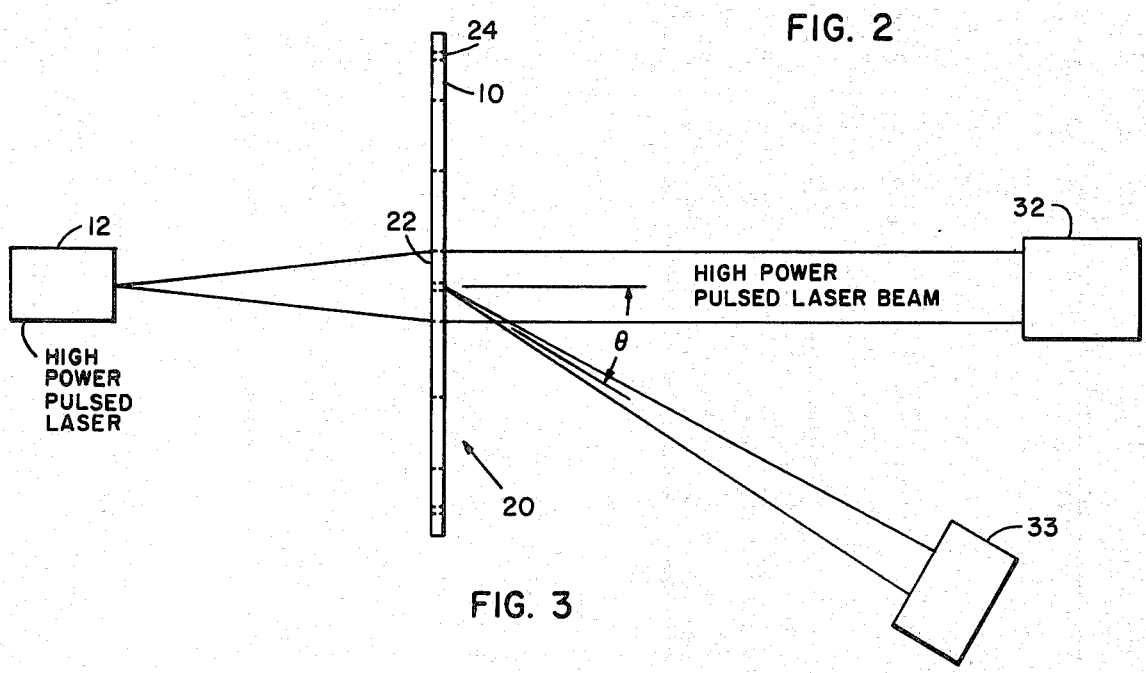
FIG. 3 is a diagrammatic plan view of the apparatus of FIG. 1 illustrating the diffracted beam of FIG. 1 used for diagnostic purposes. Only the disk and high powered laser of FIG. 1 is shown, for clarity.

The diffraction order, n, where the beam diagnostics is located is not shown in FIG. 1 for clarity. FIG. 3 which is a diagrammatic view from the top of FIG. 1 illustrates the diffracted beam where the intensity is reduced slow enough for standard diagnostic techniques to be used. Such diagnostic device is designated by the numeral 33. The angle, $\theta$, at which the diagnostic beam leaves the grating is given by $\theta = \sin^{-1} n\lambda/d$ where $\lambda$ is the wavelength of the laser, d is the spacing between the wires, and n is the diffraction order.

This device can easily be calibrated with a cw laser if desired and, if desired, each grating may pass through a cooling bath after it has been exposed to the high power pulsed laser beam and then warm-air dried before being again exposed to the pulsed laser beam. In this manner a given size disk could be used at higher repetition rates without destroying the gratings.

Note that it is not necessary to attempt to synchronize the firing of the high power laser with the rotational speed of the disk since the technique used here synchronizes the high power laser pulse with each grating. Therefore, any variations in the rotational velocity of the disk will not cause the high power pulse to miss the grating and hit the disk.

An example calculation for ten gratings on a disk used to fire the high power pulsed laser at a rate of fifty pulses per second is as follows:

The angle $\lambda$ through which the disk must turn between pulses is $\alpha = s/r$ where s is the distance along an arc between the centers of two adjacent gratings and r is the radial distance out to the center of the gratings or for ten equally spaced gratings this will be $\alpha = 36°$. For fifty pulses per second $= 36°/0.02$ sec $= 1800$ degrees per second. Therefore, the disk would have to be rotated at 1800/360 or 5 RPS which is well within the range of currently available motors. By using faster motors or larger disks higher repetitive rates could be obtained.

The gratings need not be placed symetrically on the disk, thus providing for the production of pulses with unequal times between the pulses. That is this technique may be used to taylor the pulse train to the test requirements. It is also possible to decrease the up rate for a given disk and motor speed by simply covering some of the holes through which the cw laser beam passes.

The attenuation is varied by changing the wire size and/or wire spacing. This is accomplished in the lab by a simple jig.

The power in each order is a function of several variables and is not in a readily determined ratio. Therefore calibration with a cw laser is necessary when this technique is to be used to measure power per pulse using one of the higher orders.

Also when the device is to be used as a simple attenuator and the accuracy of the well constructed gratings is not required, the gratings are replaced with a simple wire screen which works very well for this purpose.

The beam coupling apparatus may be similar to that disclosed in U.S. Pat. No. 4,035,088 issued to Andrew H. Jenkins and John J. Wachs on July 12, 1977.

We claim:

1. A multi-grating attenuator for high power pulsed laser beams comprising:
   (a) a cw laser;
   (b) a high power pulsed laser disposed for energization by said cw laser at predetermined intervals;
   (c) multi-grating attenuator means disposed for attenuating the beam of said high power pulsed laser;
   (d) means for synchronously aligning said attenuating means with said high power pulsed laser simultaneously with each pulse.

2. Apparatus as in claim 1 wherein said attenuating means includes a rotatable disk having a plurality of spaced wire gratings therein, and, means for rotating said disk.

3. Apparatus as in claim 2 wherein said means for aligning said attenuating means includes an electrical pulse generator, electrically connected to said high power pulsed laser and disposed for receiving the beam of said cw laser, said disk provided with a plurality of openings therethrough for passing said cw laser beam at said predetermined intervals to said electrical pulse generator, whereby the output of said electrical pulse generator triggers said high power pulsed laser so that the high power pulsed laser beam arrives at a grating when said grating is aligned therewith.

* * * * *